United States Patent [19]
Donelly et al.

[11] Patent Number: 5,454,070
[45] Date of Patent: Sep. 26, 1995

[54] PIXEL TO SPLINE BASED REGION CONVERSION METHOD

[75] Inventors: Ross A. Donelly, West Ryde; Jim Mulhearn, Eastwood, both of Australia

[73] Assignees: Canon Kabushiki Kaisha, Tokyo, Japan; Canon Information Systems & Research Australia, New South Wales, Australia

[21] Appl. No.: 181,248

[22] Filed: Jan. 13, 1994

[30] Foreign Application Priority Data

Jan. 15, 1993 [AU] Australia ................. PL6836

[51] Int. Cl.⁶ ............................................ G06T 11/00
[52] U.S. Cl. .................... 395/131; 395/132; 395/141; 395/142
[58] Field of Search ................... 395/129–132, 395/140–143; 358/27–32

[56] References Cited

U.S. PATENT DOCUMENTS

| | | | |
|---|---|---|---|
| 4,910,786 | 3/1990 | Eichel | 382/22 |
| 4,949,281 | 8/1990 | Hillenbrand et al. | 364/518 |
| 5,172,423 | 12/1992 | France | 382/22 |

*Primary Examiner*—Almis R. Jankus
*Attorney, Agent, or Firm*—Fitzpatrick, Cella, Harper & Scinto

[57] ABSTRACT

Computer based images are normally provided in the form of large amounts of data on a pixel by pixel basis. Method and apparatus (25) are disclosed for converting this pixel based data (7,8,9–16,17) to spline based data (FIG. 5) wherein the characteristics present in the pixel based data are substantially retained in the spline based version of the image.

35 Claims, 5 Drawing Sheets

PIXEL TO SPLINE BASED REGION CONVERSION METHOD

FIELD OF THE INVENTION

The present invention relates to picture data conversion methods and the preferred embodiment specifically discloses a method of converting a collection of pixel data to a corresponding collection of spline bounded regions, wherein the resulting regions represent information characteristics of the original pixel data.

BACKGROUND ART

Most computer graphic systems operate by displaying images on a pixel by pixel basis, often using a frame store to store the image, with the frame store also working on a pixel by pixel basis. Common display systems are capable of displaying 1280 lines×1024 pixels=1,310,720 pixels. As a result of pixel by pixel operation, it is common to store images on a pixel basis, resulting in large image files.

Recently, a system has been proposed which is capable of the real time rendering of graphic objects without the use of a frame store. That system is disclosed in Australian Patent Application No. 38251/93 (Attorney Ref: (RTO7)(202788)) entitled "A Real-Time Object Based Graphics System", claiming priority from Australian Provisional Patent No. PL 2147 filed 29 Apr. 1992, the contents of which are hereby incorporated by cross-reference, and proposes a data structure called Quadratic Polynomial Fragments (QPF's), that enables a rasterised image to be processed rapidly, permitting real-time operation. The QPF's can be generated from standard spline based graphic image data using the methods disclosed in Australian Patent Application No. 38239/93 (Attorney Ref:(RTO9)(203 174)) entitled "Bezier Spline to Quadratic Polynomial Fragment Conversion" claiming priority from Australian Provisional Patent Application No. PL 2149, filed 29 Apr. 1992 the contents of which are hereby incorporated by cross-reference.

However, it is desirable that non-spline based images be convened to QPF's thereby enabling photographically generated and/or scanned images to be economically stored, thereby ameliorating the need for large capacity fast memory, and reproduced in real-time.

SUMMARY OF THE INVENTION

Accordingly, it is an object of the present invention to provide a means for converting pixel based data into region based data, such as spline data, while substantially maintaining the information characteristics of the original pixel based data.

In accordance with one aspect of the present invention there is provided a method for transforming pixel based data into region based data, said method comprising the steps of:

generating a plurality of pixel regions from the pixel data;

determining a colour information content of said pixel regions;

creating boundaries for each of said pixel regions based on the colour information content; and determining corresponding spline information of said boundaries of each of said pixel regions.

In accordance with another aspect of the present invention there is provided a method for transforming pixel based data into region based data, said method comprising the steps of:

generating a plurality of pixel regions from the pixel data, generating a predetermined number of colour planes from said pixel regions, determining a colour information content of said pixel regions, creating boundaries for each of said pixel regions, and determining corresponding spline information of said boundaries of said pixel regions.

Preferably the colour information content of each region includes colour blending information.

BRIEF DESCRIPTION OF THE DRAWINGS

The preferred embodiment of the present invention will now be described with reference to the drawings in which.

DETAILED DESCRIPTION OF THE PREFERRED EMBODIMENT

For the purposes of the preferred embodiment, it can be assumed that the input data used by the method consists of a collection of pixels corresponding to an image, each having separate colour information for Red, Green and Blue colour portions of a particular pixel.

Forming Regions and Planes

The first stage of the preferred embodiment is the generation of pixel regions and planes. A region preferably consists of a four-connected (4-connected) group of pixels. By four-connected, it is meant that if the pixels are arranged in a grid in which each pixel is represented by a square with four sides. Then two pixels are said to be four-connected if they share a common side.

A more formal definition of a region is a set of pixels, S, such that for every pair of pixels $a \in S$, $b \in S$, there exist a vector of pixels of the form $(p_1, p_2, \ldots, p_n)$, $p_1 = a$, and $P_2 = b$, where n is an integer, $n > 0$, and $$\forall i \in \{,2, \ldots, n\}, p_i \in S, \text{ and} \qquad (EQ\ 1)$$

$$\forall i \in \{,2, \ldots, n-1\}, p_i \text{ and } p_{i+1} \text{ are four connected}$$

Whereas a plane consists of a set of regions all of the same colour, the colour can be a flat colour or a blending of colours.

Region Growing

The region creation and growing process proceeds as follows. Initially, all pixels are unowned, and an unowned pixel is located and designated as a new single pixel region. This pixel is known as the seed of the region. The perimeter of the region is then searched for pixels which are also unowned, that are 4-connected to the region, and are within a predetermined threshold in colour-difference from the colour of the seed of the region. When such a pixel is found, it is added to the region and another such pixel is searched for. When no such pixels are left, growing of the region is terminated. A new unowned pixel is then selected, and a new region growing process is again started. When no more regions can be started, because there are no more unowned pixels in the image, region growing is terminated.. All the created regions are then assigned a colour which is the average colour of pixels in the region.

Once the collection of regions has been created, a process of region merging is carried out where the number of regions is reduced below a predetermined number. Regions are selected to be eliminated by merging into a selected other region. The other region must be adjacent (4-connected) to the region being eliminated. When a region is eliminated, it is merged into the adjacent region which is closest in colour. The colour of the new region is the average of the colours of the old regions, weighted proportionally by the numbers of pixels in the old regions.

First, all regions containing only one or two pixels are eliminated, then the regions are eliminated in order of increasing "cost". The cost of eliminating a region is determined by a predefined heuristic function. A suitably defined heuristic is one that takes into account the number of pixels in a region and the colour difference between the region and the nearest-coloured adjacent region. One such calculation is as follows:

$$\text{cost} = \text{sqrt}(\text{num\_pixels}) * \log(\text{num\_pixels}) * \text{colour\_difference} \quad (EQ\ 2)$$

When the number of regions is equal to the predetermined number, the region merging process is stopped.

Plane Merging

Colour display devices in use often are implemented by means of a colour lookup table of a predetermined static size, that results in the display device only being able to simultaneously display, at any one time, a predetermined number of colours corresponding to the number of entries in the table. The actual colours that can be displayed in a particular image can be varied by alteration of the colour lookup table.

Where the final image is to be displayed on a device having a limited number of simultaneously displayable colours, a process of merging of the regions into planes is carried out. A plane is a set of regions of the same colour. In the process of plane merging, the number of planes is reduced to a predetermined number, which, for example, can correspond to the number of entries in the colour lookup table. Initially, each region is considered to be a plane. Planes are then selected to be eliminated by merging into a selected other plane. The other plane is not required to be adjacent in any way to the plane being eliminated. When a plane is eliminated, it is merged into the plane which is closest in colour. The colour of the new plane is the average of the colours of the old planes, weighted proportionally by the numbers of pixels in the old planes.

Planes are eliminated in order of increasing "cost". The cost of eliminating a plane is a predetermined heuristic being, for example, the colour difference between a first plane and the nearest-coloured second plane.

When the number of planes is equal to the predetermined number, the plane merging process is stopped.

Fitting of Blends

The preferred embodiment of the pixel to spline based region conversion method has been developed specifically, but not exclusively, for use in a real time graphic image rendering system, using an apparatus such as that disclosed in the aforementioned Australian Patent Application entitled "A Real-Time Object Based Graphics System". In that apparatus, it is possible to render graphic 'blends'. A blend is an area of an image where a first pixel colour starts out as being of one colour and a final pixel colour is a second colour, with the pixels intermediate the first and final pixels gradually changing from the first colour to the final colour. For example, if the first colour is black and the final colour is white then the intermediate colours would form a grey scale from black to white.

If then a blended output is desired, it is necessary to determine if a region is of a blended nature and in what direction the blend is occurring. Hence, for each plane in the image, a blend for the plane must be determined. This process, preferably proceeds by fitting a "least-squares" blend to each plane. For each plane, the following metrics are calculated, where the plane consists of a set of pixels, and any pixel in the plane has colour $(r_i, g_i, b_i)$ corresponding to the red, green and blue portions of the pixel and a position $(x_i, y_i)$:

$s_1$=number of pixels (EQ 3)

$s_x = \Sigma\ x_i$ for all pixels in the plane (EQ 4)

$s_y = \Sigma\ y_i$ for all pixels in the plane (EQ 5)

$s_r = \Sigma\ r_i$ for all pixels in the plane (EQ 6)

$s_g = \Sigma\ g_i$ for all pixels in the plane (EQ 7)

$s_b = \Sigma\ b_i$ for all pixels in the plane (EQ 8)

$s_{xx} = \Sigma\ (x_i * x_i)$ for all pixels in the plane (EQ 9)

$s_{yy} = \Sigma\ (y_i * y_i)$ for all pixels in the plane (EQ 10)

$s_{xy} = \Sigma\ (x_i * y_i)$ for all pixels in the plane (EQ 11)

$s_{rr} = \Sigma\ (r_i * r_i)$ for all pixels in the plane (EQ 12)

$s_{gg} = \Sigma\ (g_i * g_i)$ for all pixels in the plane (EQ 13)

$s_{bb} = \Sigma\ (b_i * b_i)$ for all pixels in the plane (EQ 14)

$s_{xr} = \Sigma\ (x_i * r_i)$ for all pixels in the plane (EQ 15)

$s_{yr} = \Sigma\ (y_i * r_i)$ for all pixels in the plane (EQ 16)

$s_{xg} = \Sigma\ (x_i * g_i)$ for all pixels in the plane (EQ 17)

$s_{yg} = \Sigma\ (y_i * g_i)$ for all pixels in the plane (EQ 18)

$s_{xb} = \Sigma\ (x_i * b_i)$ for all pixels in the plane (EQ 19)

$s_{yb} = \Sigma\ (Y_i * b_i)$ for all pixels in the plane (EQ 20)

A blend angle $\theta$ is then varied between 0 and n in steps of 0.1. For each blend-angle $\theta$, a least-squares blend is fitted at angle $\theta$. This is done by solving the following sets of linear equations for the colours $\alpha$ and $\beta$:

$$A = \begin{bmatrix} s_1 & \\ & \end{bmatrix} \begin{bmatrix} \alpha_r \\ \beta_r \end{bmatrix} = \begin{bmatrix} s_r \\ s_{xr}\cos\theta \end{bmatrix} \quad (s_x\cos\theta - s_y\sin\theta) \quad (EQ\ 21)$$
$$(s_x\cos\theta - s_y\sin\theta)\ s_{xx}\cos^2\theta - 2s_{xy}\cos\theta\sin\theta + s_{yy}\sin^2\theta) \quad (EQ\ 22)$$

$$A \begin{bmatrix} \alpha_g \\ \beta_g \end{bmatrix} = \begin{bmatrix} s_g \\ s_{xg}\cos\theta - s_{yg}\sin\theta \end{bmatrix} \quad (EQ\ 23)$$

$$A \begin{bmatrix} \alpha_b \\ \beta_b \end{bmatrix} = \begin{bmatrix} s_b \\ s_{xb}\cos\theta - s_{yb}\sin\theta \end{bmatrix} \quad (EQ\ 24)$$

An error term is then calculated for each fit as follows:

$$\text{error} = s_{rr} + s_{gg} + s_{bb} - 2(\alpha_r s_r + \alpha_g s_g + \alpha_b s_b) - \quad \text{(EQ 25)}$$

$$2(\beta_r s_{xr} + \beta_g s_{xg} + \beta_b s_{xb})\cos\theta + 2(\beta_r s_{yr} + \beta_g s_{yg} + \beta_b s_{yb})\sin\theta +$$

$$2(\alpha_r\beta_r + \alpha_g\beta_g + \alpha_b\beta_b)(s_x\cos\theta - s_y\sin\theta) +$$

$$s_1(\alpha_r^2 + \alpha_g^2 + \alpha_b^2) + (\beta_r^2 + \beta_g^2 + \beta_b^2)(s_{xx}\cos^2\theta -$$

$$2s_{xy}\cos\theta\sin\theta + s_{yy}\sin^2\theta)$$

The angle θ whose error term is least is used as the blend angle. The blend is defined to have a colour α at the origin (0,0) and has colour-gradient β in the direction of the angle θ.

Smoothing

At this stage, the borders between the various regions are typically very complex, often containing many branching peninsulas of one or two pixels width. This is the result of applying a sharp threshold in the region growing process. The borders are then simplified using a pixel-based process. A preferred process for smoothing the borders of the regions can be described as "filling in holes", where a hole is a one-pixel-deep indentation in a border between two regions.

Turning now to the drawings, FIG. 1 shows a number of examples of region boundaries each with various candidate holes, which are marked with dots, between a first region 16 and a second region 17. FIG. 1(A) and 1(B) are each examples of horizontal holes 7, 8. FIG. 1(C) and 1(D) are each examples of vertical holes 9, 10. FIG. 1 (E) and 1(F) are each examples of diagonal holes 11, 12, whilst FIG. 1(G) and 1(H) show examples of other types of holes 13, 14.

Filling in a hole means changing the ownership of pixels in the hole to the other region. A hole is only filled in if filling it in would not change the colour of any pixels in the hole beyond a predetermined colour-distance of the colour of that pixel in the original image.

In addition, a hole is also only filled-in, if doing so would not split a region in two. This can be achieved by following each pixel regions edge and performing the transformations as shown in FIG. 2 (A)–(D) as well as their symmetrical equivalents. The transformations ensure that the borders of each region are maintained.

Referring now to FIG. 3 (A)–(F) there is shown an example of the progressive operation of the smoothing method which can be implemented by repeatedly passing through the image in scanline-order, filling in holes, until there are no more holes that may be filled in as shown in FIG. 3 (F).

Region Topology and Boundary Recording

An exterior region is now added as a new region, by adding a single-pixel wide border to the image. The exterior region exists as a special region and is not actually drawn. It exists merely to simplify operation of the following stages.

The image is now made up of regions. Each region has an outer boundary and zero or more inner boundaries, apart from the special exterior region which is defined only to have one inner boundary. When fitting splines to region boundaries, it is required that the same splines are fitted to both "sides" of the boundary. That is, along the border of adjoining regions A and B, there must be no overlap and no empty space between the splines used to define the two regions.

Referring now to FIG. 4 (A)–4(D), to ensure that no overlap or empty space exists, the region boundaries are searched for a collection of "nodes". A node is a point on the corner of a pixel where three or four regions meet, or a "special node", which is a pixel-corner chosen on the boundary of two regions which have no other nodes on that boundary (i.e. the outer boundary of one region is an inner boundary of another). There are no nodes on the outside of the exterior region. Splines can then be fitted to the sections of region-border between pairs of nodes, and can then be used for the boundaries of both regions.

For each node, a node adjacency measure is recorded by making a list of the adjacent nodes, being nodes that are reached by following a region border out from the node in a clockwise order when exiting the node. It should be noted that it is possible to exit a node and come back to the same node, in fact this is always the case for special nodes, hence some nodes are adjacent to themselves.

For each region, a boundary measure is then recorded by making a list of boundaries. Each boundary is recorded simply as a pointer to a node and a direction (North, South, East or West) out of the node such that the region will be on the right when exiting the node. The special case of the exterior region has only one boundary, which is an inner boundary.

For each region, a boundary sort is performed by determining which boundary is the outer boundary and the outer boundary is moved to the front of the boundary list for that region. The exterior region has no outer boundary and hence is not sorted.

Spline Number Calculation

Each section of a region's boundary between two nodes is analysed by following along the region's boundary and recording the coordinates of all pixel corners. This gives an array of points, with each point being one pixel distant from the next point in the array in a North, South, East or West direction.

A predetermined desired length of an array of points is used to analyse the array. If an array is more than 1.5 times the desired length, it is split up into several smaller arrays, each near as possible to the desired length.

The number of Bezier splines to fit to each array is calculated by making a copy of the array and filtering the copy twice with a low-pass filter such as a box filter of width three points. For each point in the copy, the curvature is measured as the signed magnitude of the cross-product of the unit vectors from the last point to a current point and from the current point to the next point.

The number of places where the curvature changes sign are counted. A change in curvature sign is only registered if the curvature going past zero by a certain predetermined threshold.

The number of Bezier splines is then taken to be (0.75 * (curvature_changes+1)).

Each array of points is passed to the spline fitter along with the number of Beziers to fit.

Least Squares Spline Fitting

Having processed region boundaries into discrete chains of pixels it is now required to calculate a smooth spline curve for each of these chains such that the curve is influenced by the given data points but is not restricted to pass through all the given points, save the first and last data points. This is achieved by applying a mathematical technique known as least squares.

The least squares technique applied here is somewhat more advanced than that found in contemporary text books due to the fact that the underlying mathematics used is based on non-uniform non-rational B-splines. The benefit of using this mathematics comes from the fact that the B-spline basis is more robust than the more traditional polynomial approach. More importantly it allows complete freedom in dealing with arbitrarily shaped geometry. The least squares B-spline technique is described below.

Given p data points, it is necessary to determine a set of n control vertices that minimise the distance between the cubic B-spline curve they define, and the data points.

The equation of a 4th order B-spline curve is given by:

$$\underline{C}(u) = \sum_{j=0}^{n-1} \underline{V}_j B_{j4}(u) \quad \text{(EQ 26)}$$

where the position of the jth control vertex is represented by $$\underline{V}_j = \begin{bmatrix} X_j \\ Y_j \end{bmatrix} \quad \text{(EQ 27)}$$

It is required therefore to minimise the following expression:

$$\underline{S} = \sum_{k=0}^{p-1} (\underline{C}(u_k) - x_k)^2 \quad 4 \leq n \leq p \quad \text{(EQ 28)}$$

where the kth data point is represented by:

$$x_k = \begin{bmatrix} x_k \\ y_k \end{bmatrix} \quad \text{(EQ 29)}$$

Figure 1A:
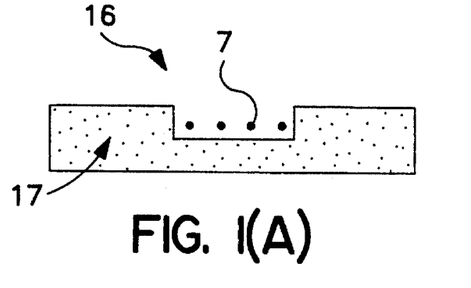
FIG. 1(A) to FIG. 1(H) illustrate various processes of filling in holes of a region boundary.
Figure 1B:
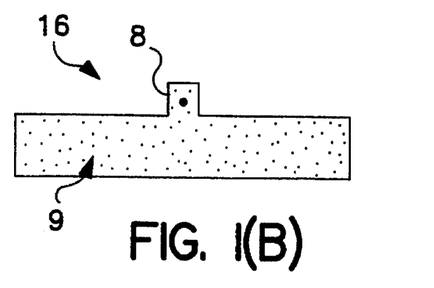
Figure 1C:
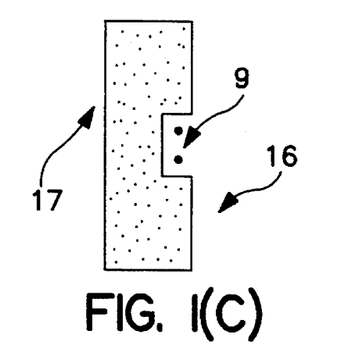
Figure 1D:
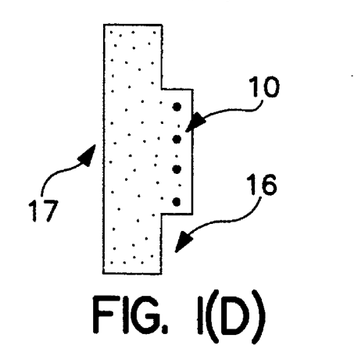
Figure 1E:
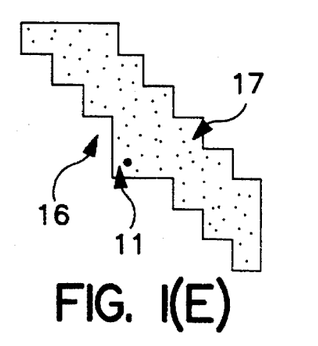
Figure 1F:
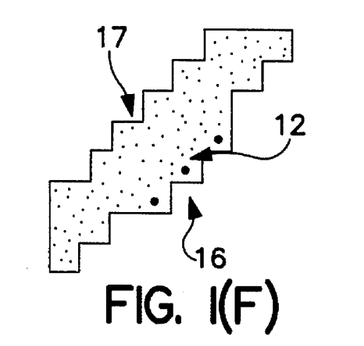
Figure 1G:
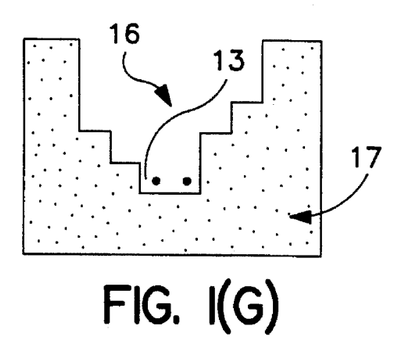
Figure 1H:
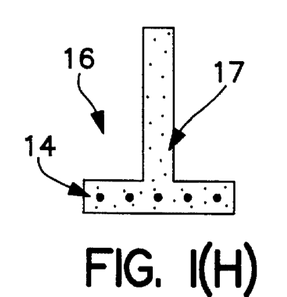
Figure 2A:
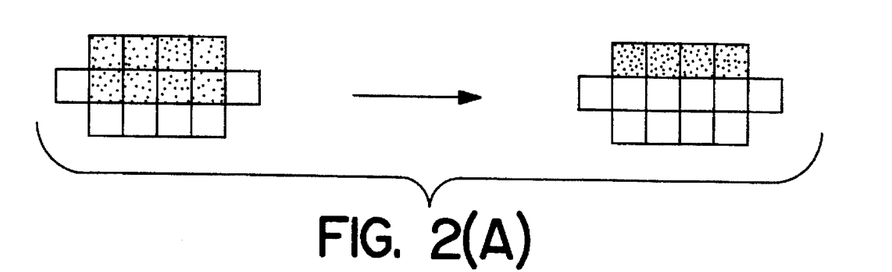
FIG. 2(A) to FIG. 2(D) illustrate various applicable rules for filling in holes.
Figure 2B:
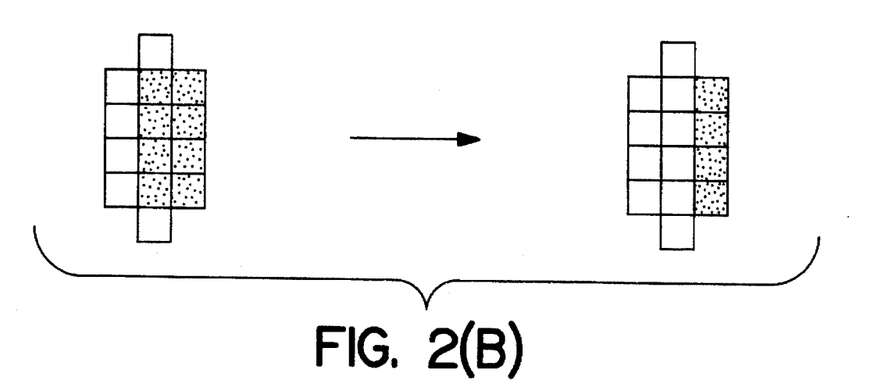
Figure 2C:
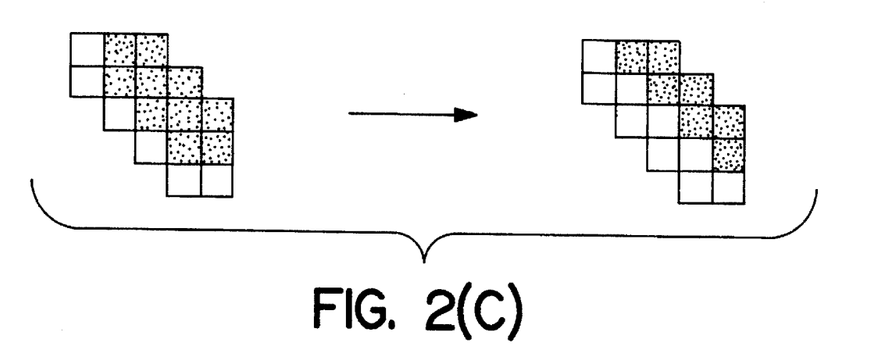
Figure 2D:
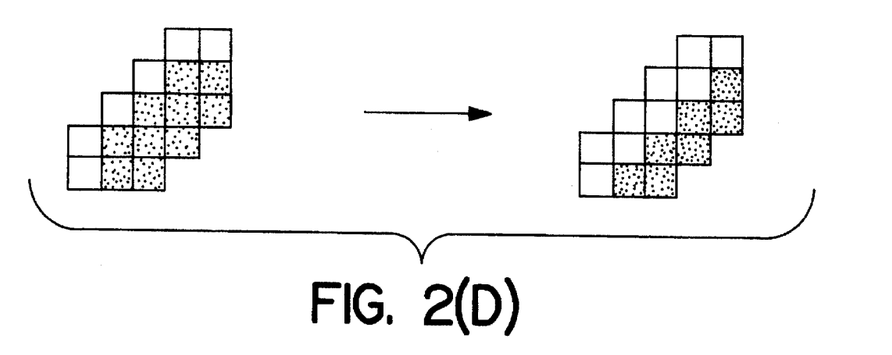
Figure 3A:
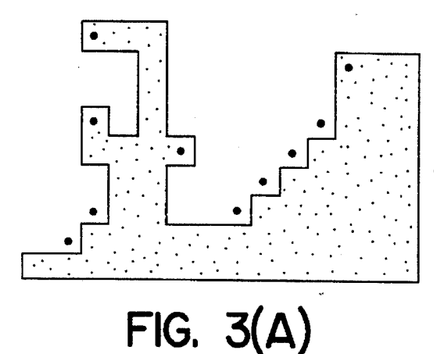
FIG. 3(A) to FIG. 3(F) illustrate an example of one process for filling in holes.
Figure 3B:
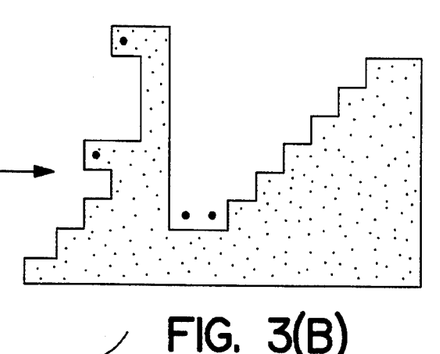
Figure 3C:
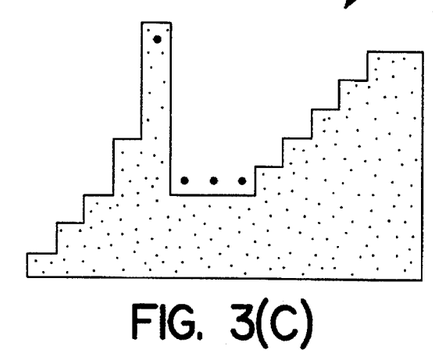
Figure 3D:
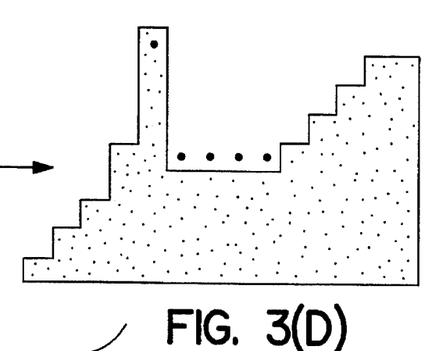
Figure 3E:
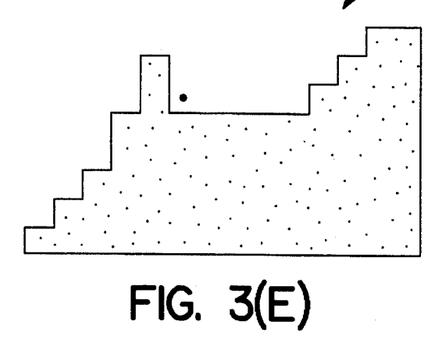
Figure 3F:
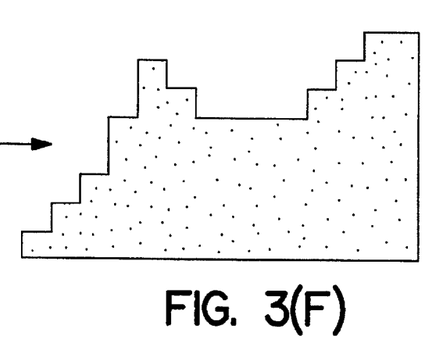
Figure 4A:
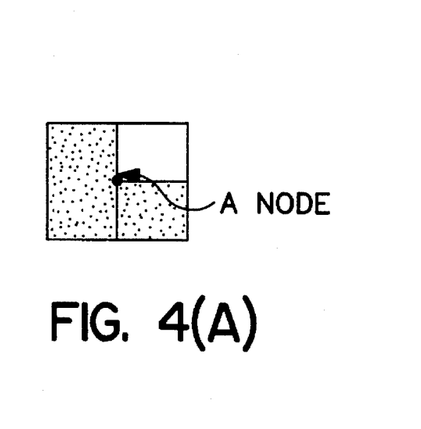
FIG. 4(A) to FIG. 4(D) illustrate various examples for determination of nodes on the boundaries of a region.
Figure 4B:
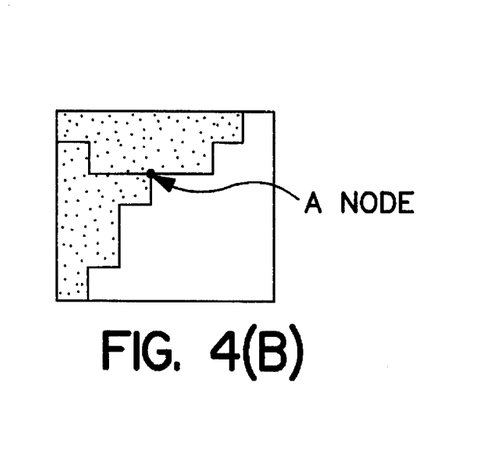
Figure 4C:
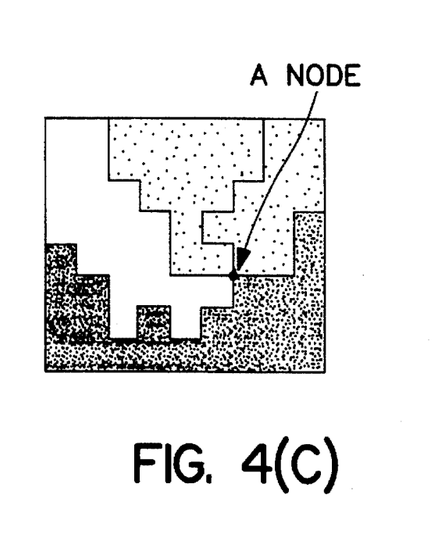
Figure 4D:
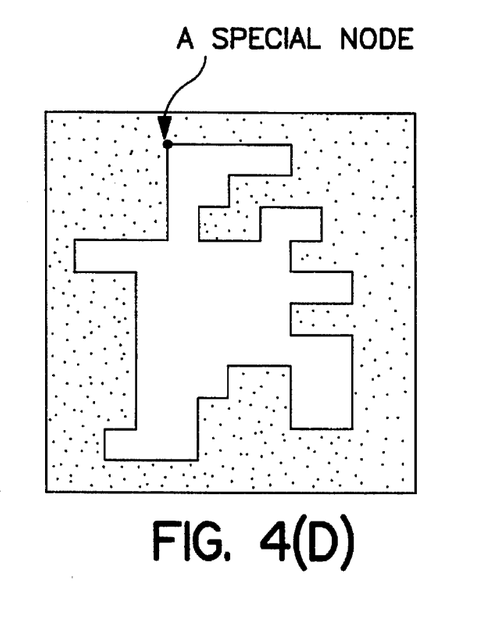
Figure 5:
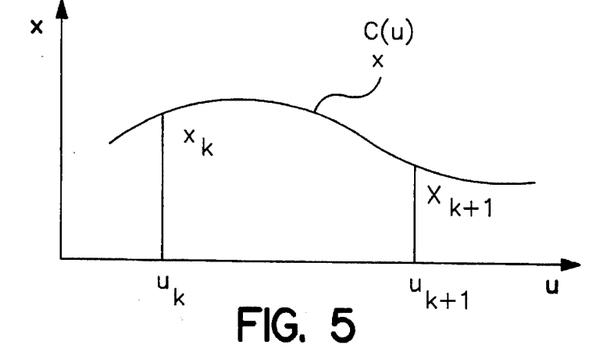
FIG. 5 shows a process of a least squares fit of piecewise Bezier splines.

With reference to FIG. 5, it is assumed that the X and Y domains will be treated analogously. Consequently, only the X domain is shown in FIG. 5 and considered in the following description. In order to determine the least squares fit, the expression to be minimised becomes:

$$S_x = \sum_{k=0}^{p-1} \left( \sum_{j=0}^{n-1} X_j B_{j4}(u_k) - x_k \right)^2 \quad \text{(EQ 30)}$$

To minimise this expression, the partial derivatives are computed and set to zero:

$$\frac{\partial S_x}{\partial X_i} = 2 \sum_{k=0}^{p-1} \left( \sum_{j=0}^{n-1} X_j B_{j4}(u_k) - x_k \right) B_{i4}(u_k) = 0 \quad \text{(EQ 31)}$$

$i = 0$ to $n - 1$.

This equation can be simplified as follows:

$$\sum_{k=0}^{p-1} \sum_{j=0}^{n-1} X_j B_{j4}(u_k) B_{i4}(u_k) = \sum_{k=0}^{p-1} x_k B_{i4}(u_k) \quad \text{(EQ 32)}$$

$$\sum_{j=0}^{n-1} \left( \sum_{k=0}^{p-1} B_{j4}(u_k) B_{i4}(u_k) \right) X_j = \sum_{k=0}^{p-1} x_k B_{i4}(u_k)$$

Applying this to each Xi, there is produced a set of n simultaneous equations in n unknowns which can be solved by any of the standard techniques such as Gaussian elimination.

For this application however, it is important that the resultant spline curve interpolate the first and last data point. This is achieved by setting the first and last control points to the known data points and removing them from the system to leave n−1 equations in n−1 unknowns, and solving for this system.

This results in the following expression for each Xi:

$$\sum_{j=1}^{n-2} \left( \sum_{k=0}^{p-1} B_{j4}(u_k) B_{i4}(u_k) \right) X_j = \sum_{k=0}^{p-1} x_k B_{i4}(u_k) - \quad \text{(EQ 33)}$$

$$\sum_{k=0}^{p-1} B_{04}(u_k) B_{i4}(u_k) x_0 - \sum_{k=0}^{p-1} B_{n-1}(u_k) B_{i4}(u_k) x_p$$

Thus, given an open pixel chain and an estimation of the number of cubic spline curves required, a non-uniform non-rational B-spline curve is calculated that approximates the form of the pixel chain. This is then convened to a set of Bezier curves and stored with the pixel chain. Once all chains have been processed, the resulting Bezier splines for each region can be output, together with colour and blending information, to a file in a format suitable for later use by a graphics display system.

Figure 6:
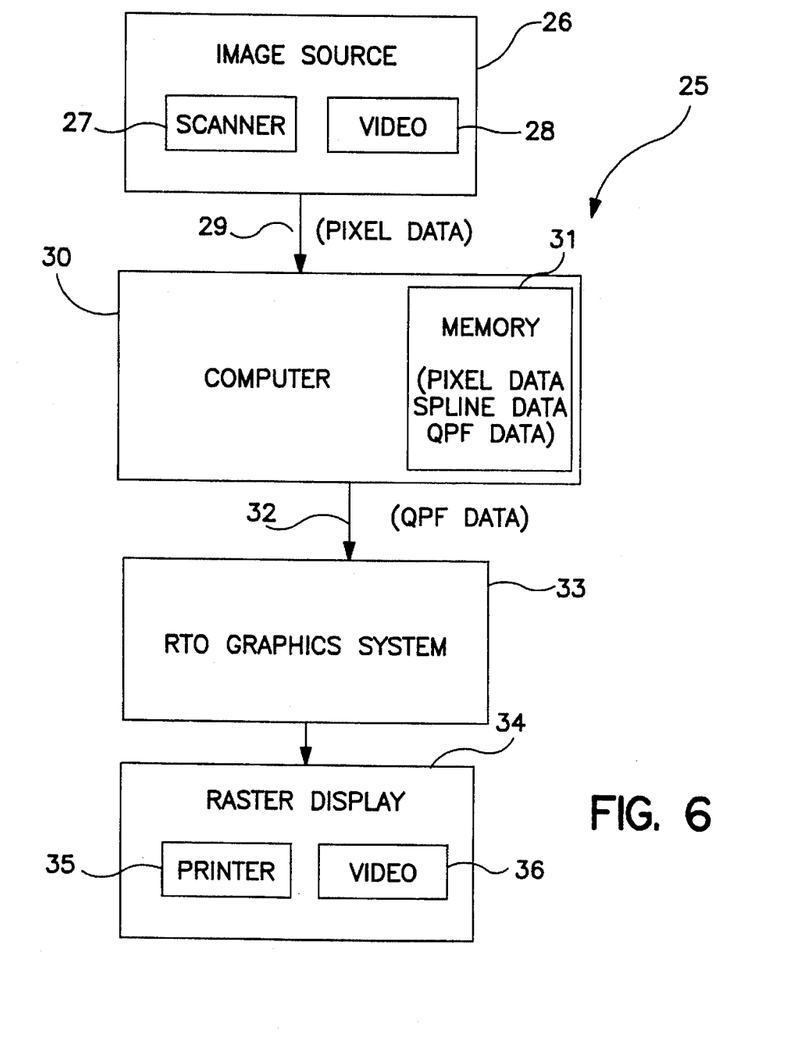
FIG. 6 shows one arrangement in which the preferred embodiment can be used.

The preferred embodiment can be implemented by a computer program on a general purpose computer and can be used in the manner shown by the arrangement 25 of FIG. 6. In FIG. 6, an image source 26, such as a scanner 27 or video (e.g. camera) 28 output pixel based image data 29 to a computer 30. The data 29 is stored in a memory 31 in the computer 30 thereby enabling a program that implements the preferred embodiment to operate to convert the pixel data to spline based data which can also be stored in the memory 31. The computer 30 can then be operated in accordance with the aforementioned Australian Patent Application No. 38239/93 (Attorney Ref: (RTO9)(203174)) to convert the spline data into QPF data which can also be stored in the memory 31. The QPF data can thereafter be accessed by a real-time object (RTO) graphic system 33 that operates in accordance with the aforementioned Australian Patent Application No. 38244/93 (Attorney Ref. (RTO7)(202788)), to output raster image data to a raster display 34, such as a printer 35 or a video display 36.

The foregoing describes only one embodiment of the present invention, modifications, obvious to those skilled in the art, can be made thereto without departing from the scope of the present invention. For example, extensions to colour systems other than those based on RGB colour information, will be readily apparent. Additionally, the production of an output file containing no blended regions will be readily achieved by not performing the fitting of blends process.

We claim:

1. A method for transforming pixel data of an image into region data, said method comprising the steps of:

generating a plurality of regions from the pixel data, each said region being grown from at least one pixel unallocated to any other of said regions by comparing a color of unallocated pixels adjacent said at least one pixel with a predetermined color function of said at least one pixel, and if said colors are within a predetermined relationship, allocating said adjacent pixels to said region;

determining color information content data of each said region;

creating boundaries for each of said regions based on the color information content data; and determining corresponding spline information of said boundaries of each of said regions.

2. A method as claimed in claim 1 wherein the color information content data of each region comprises color blending information.

3. A method as claimed in claim 1 wherein said regions are formed from 4-connected groups of pixels.

4. A method as claimed in claim 1 wherein said generating step includes reducing the number of pixel regions below a predetermined number through merging adjacent ones of said regions.

5. A method as claimed in claim 4 wherein said reduction uses a heuristic measure based upon the number of pixels within a region and the color difference between the region and the nearest colored adjacent region.

6. A method as claimed in claim 1 wherein the step of creating said boundaries includes smoothing the boundaries of said regions.

7. A method as claimed in claim 1 wherein the step of determining said corresponding spline information step includes assigning a number of splines to each said region dependant on the length of the boundary of each said region.

8. A method as claimed in claim 1 wherein the step of determining said corresponding spline information step includes using a least squares fitting method through the pixels on the boundaries of each said region.

9. A method as claimed in claim 1 wherein the predetermined color function is the value of a first pixel of said region.

10. A method as claimed in claim 1 wherein the predetermined color function is an average color value of all pixels in said region.

11. A method as claimed in claim 1 wherein the predetermined relationship is a predetermined color difference between the unallocated pixel and the predetermined color function of said region.

12. A method a claimed in claim 1 wherein the predetermined relationship is a positional relationship between the unallocated pixel and those pixels included in said region.

13. A method for transforming pixel data of an image into region data, said method comprising the steps of:

generating a plurality of regions from the pixel data, each said region being grown from at least one pixel unallocated to any other of said regions by comparing a color of unallocated pixels adjacent said at least one pixel with a predetermined color function of said at least one pixel, and if said colors are within a predetermined relationship, allocating said adjacent pixels to said region;

generating a predetermined number of color planes from said regions, determining color information content data for each said region, creating boundaries for each of said regions, and determining corresponding spline information of said boundaries of said regions.

14. A method as claimed in claim 13 wherein the color information content data of each said region comprises color blending information.

15. A method as claimed in claim 13 wherein said pixel regions are formed from 4-connected groups of pixels.

16. A method as claimed in claim 13 wherein said generation of a predetermined number of planes comprises assigning a plane to each said region and then reducing the number of planes by choosing two planes which are close in color and merging the two planes.

17. A method as claimed in claim 13 wherein the step of creating said boundaries step includes smoothing the boundaries of said pixel regions.

18. A method as claimed in claim 13 wherein the step of determining said corresponding spline information includes assigning a number of splines to each region dependant on the length of the boundary of each region.

19. A method as claimed in claim 13 wherein the step of determining said corresponding spline information includes using a least squares fitting method through the pixels on the boundaries of each region.

20. An apparatus for transforming pixel data of an image into region data, said apparatus comprising:

means for generating a plurality of regions from the pixel data, each said region being grown from at least one pixel unallocated to any other of said regions by comparing a color of unallocated pixels adjacent said at least one pixel with a predetermined color function of said at least one pixel, and if said colors are within a predetermined relationship, allocating said adjacent pixels to said region;

means for determining color information content data of each said region;

means for creating boundaries for each of said regions based on the color information content data; and means for determining corresponding spline information of said boundaries of each of said regions.

21. An apparatus as claimed in claim 20 further comprising input means for inputting said pixel data.

22. An apparatus as claimed in claim 21 wherein said input means comprises a scanner.

23. An apparatus as claimed in claim 21 wherein said input means is a video signal producing apparatus.

24. An apparatus as claimed in claim 20 further comprising generating means for generating image data based on said spline data.

25. An apparatus as claimed in claim 20 or 24 further comprising output means for outputting the image data.

26. An apparatus as claimed in claim 25 wherein said output means is a printer.

27. An apparatus as claimed in claim 25 wherein said output means is a display.

28. An apparatus for transforming pixel data of an image into region data, said apparatus comprising;

means for generating a plurality of regions from the pixel data, each said region being grown from at least one pixel unallocated to any other of said regions by comparing a color of unallocated pixels adjacent said at least one pixel with a predetermined color function of said at least one pixel, and if said colors are within a predetermined relationship, allocating said adjacent pixels to said region;

means for generating a predetermined number of color planes from said regions, means for determining color information content data for each said region, means for creating boundaries for each of said regions, and means for determining corresponding spline information of said boundaries of said regions.

29. Apparatus as claimed in claim 28 further comprising input means for inputting said pixel data.

30. Apparatus as claimed in claim 29 wherein said input means comprises a scanner.

31. Apparatus as claimed in claim 28 wherein said input means is a video signal producing apparatus.

32. Apparatus as claimed in claim 28 further comprising generating means for generating image data based on said spline data.

33. Apparatus as claimed in claim 28 or 32 further comprising output means for outputting the image data.

34. Apparatus as claimed in claim 33 wherein said output means is a printer.

35. Apparatus as claimed in claim 33 wherein said output means is a display.

* * * * *

UNITED STATES PATENT AND TRADEMARK OFFICE
CERTIFICATE OF CORRECTION

PATENT NO. : 5,454,070
DATED : September 26, 1995
INVENTOR(S) : Ross A. Donelly, et al It is certified that error appears in the above-indentified patent and that said Letters Patent is hereby corrected as shown below:

COLUMN 1

Line 42, "convened" should read --converted--.

COLUMN 2

Line 36, "Red, Green and Blue" should read --red, green and blue--;

Line 49, "exist" should read --exists--;

Line 52, "{,2...,n}," should read --{1,2...,n},--;

Line 54, "{,2...,n-1}, should read --{1,2...,n-1},--.

COLUMN 3

Line 8, "terminated.." should read --terminated.--.

UNITED STATES PATENT AND TRADEMARK OFFICE
CERTIFICATE OF CORRECTION

PATENT NO. : 5,454,070  
DATED : September 26, 1995  
INVENTOR(S) : Ross A. Donelly, et al Page 2 of 3

It is certified that error appears in the above-indentified patent and that said Letters Patent is hereby corrected as shown below:

COLUMN 4

Line 49, "n" should read --$\pi$--;

Equations 21 and 22

"
$$A = \begin{bmatrix} s_1 & \begin{bmatrix} \alpha_r \\ \beta_r \end{bmatrix} & \begin{bmatrix} s_r \\ s_{xr}\cos\theta - s_{yr}\sin\theta \end{bmatrix} & (s_x\cos\theta - s_y\sin\theta) \\ (s_x\cos\theta - s_y\sin\theta) & & (s_{xx}\cos^2\theta - 2s_{xy}\cos\theta\sin\theta + s_{yy}\sin^2\theta) \end{bmatrix}$$
(EQ 21)  
(EQ 22)

"

should read

--
$$A = \begin{bmatrix} s_1 & (s_x\cos\theta - s_y\sin\theta) \\ (s_x\cos\theta - s_y\sin\theta) & (s_{xx}\cos^2\theta - 2s_{xy}\cos\theta\sin\theta + s_{yy}\sin^2\theta) \end{bmatrix} \quad \text{(EQ 21)}$$

$$A \begin{bmatrix} \alpha_r \\ \beta_r \end{bmatrix} = \begin{bmatrix} s_r \\ s_{xr}\cos\theta - s_{yr}\sin\theta \end{bmatrix} \quad \text{(EQ 22)}$$
--

UNITED STATES PATENT AND TRADEMARK OFFICE
CERTIFICATE OF CORRECTION

PATENT NO.   :  5,454,070

DATED        :  September 26, 1995

INVENTOR(S)  :  Ross A. Donelly, et al

It is certified that error appears in the above-indentified patent and that said Letters Patent is hereby corrected as shown below:

COLUMN 6

Line 35, "comers." should read --corners.--.

COLUMN 9

Line 37, "a" should read --as--.

Signed and Sealed this

Twenty-third Day of April, 1996

*Attest:*

BRUCE LEHMAN

*Attesting Officer*      Commissioner of Patents and Trademarks

UNITED STATES PATENT AND TRADEMARK OFFICE
CERTIFICATE OF CORRECTION

PATENT NO. : 5,454,070

DATED : September 26, 1995

INVENTOR : ROSS ALEXANDER DONNELLY, ET AL.

It is certified that errors appear in the above-identified patent and that said Letters Patent is hereby corrected as shown below:

COLUMN 7

(EQ) 28, " $\underline{S} = \sum_{k=0}^{p-1} (\underline{C}(u_k) - x_k)^2 \quad 4 \leq n \leq p$ (EQ 28) "

should read as follows:

-- $$\underline{S} = \sum_{k=0}^{p-1} (\underline{C}(u_k) - x_k)^2 \quad 4 \leq n \leq p$$ (EQ 28) --

(EQ 29) " $x_k = \begin{bmatrix} x_k \\ y_k \end{bmatrix}$ (EQ 29) "

should read as follows:

-- $$x_k = \begin{bmatrix} x_k \\ y_k \end{bmatrix}$$ (EQ 29) --

UNITED STATES PATENT AND TRADEMARK OFFICE
CERTIFICATE OF CORRECTION

PATENT NO. : 5,454,070

DATED : September 26, 1995

INVENTOR : ROSS ALEXANDER DONNELLY, ET AL.

It is certified that errors appear in the above-identified patent and that said Letters Patent is hereby corrected as shown below:

<u>COLUMN 7, Cont'd.</u>

(EQ 31), "
$$\frac{\partial S_x}{\partial X_i} = 2\sum_{k=0}^{p-1}\left(\sum_{j=0}^{n-1} X_j B_{j4}(u_k) - x_k\right) B_{i4}(u_k) = 0 \quad (EQ\ 31)$$
$i = 0$ to $n-1$.
"

should read as follows:

-- $$\frac{\partial S_x}{\partial X_i} = 2\sum_{k=0}^{p-1}\left[\sum_{j=0}^{n-1} X_j B_{j4}(u_k) - x_k\right] B_{i4}(u_k) = 0 \qquad i = 0 \text{ to } n-1. \quad (EQ\ 31)$$ --

Signed and Sealed this

Ninth Day of July, 1996

Attest:

BRUCE LEHMAN

Attesting Officer

Commissioner of Patents and Trademarks